US 6,545,975 B1

United States Patent
Giardina et al.

(10) Patent No.: US 6,545,975 B1
(45) Date of Patent: Apr. 8, 2003

(54) METHOD OF ENHANCING SECURITY FOR THE TRANSMISSION OF INFORMATION

(75) Inventors: Charles Robert Giardina, Mahwah, NJ (US); Ashok N. Rudrapatna, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/294,165

(22) Filed: Apr. 19, 1999

(51) Int. Cl.[7] ............................. H04J 11/00; H04B 7/216

(52) U.S. Cl. ..................... 370/208; 370/335; 370/441; 370/342

(58) Field of Search .................................. 370/209, 208, 370/335, 441, 342, 329, 328; 375/141, 146

(56) References Cited

U.S. PATENT DOCUMENTS

| | | | | | |
|---|---|---|---|---|---|
| 5,515,396 | A | * | 5/1996 | Dalekotzin | 370/209 |
| 5,602,833 | A | * | 2/1997 | Zehavi | 370/209 |
| 6,091,760 | A | * | 7/2000 | Giallorenzi et al. | 370/208 |
| 6,122,310 | A | * | 9/2000 | Ziemer et al. | 370/142 |
| 6,125,378 | A | * | 9/2000 | Barbano | 708/254 |
| 6,314,125 | B1 | * | 11/2001 | Shanbhag | 370/208 |
| 6,351,498 | B1 | * | 2/2002 | Yamao et al. | 370/335 |

* cited by examiner

Primary Examiner—William Trost
Assistant Examiner—Rafael Perez-Gutierrez

(57) ABSTRACT

Quasi-Walsh function systems are developed which allow multiple access as well as spectral spreading for interception and jamming prevention. Mutual interference is minimal due to orthogonal spreading. High signal hiding capability occurs by utilizing a large number of distinct orthogonal codes. An encoding algorithm is presented which allows a simple way of "keeping track" of the different systems of Quasi-Walsh systems as well as determining appropriate values for given users at specified chip values.

24 Claims, 1 Drawing Sheet

$$\underline{20}$$

$$\begin{pmatrix} 1 & 1 \\ 1 & -1 \end{pmatrix} \begin{pmatrix} 1 & 0 \\ 0 & 1 \end{pmatrix} = H^* D0 = Q0 = \begin{pmatrix} 1 & 1 \\ 1 & -1 \end{pmatrix}$$

$$\begin{pmatrix} 1 & 1 \\ 1 & -1 \end{pmatrix} \begin{pmatrix} 1 & 0 \\ 0 & -1 \end{pmatrix} = H^* D1 = Q1 = \begin{pmatrix} 1 & -1 \\ 1 & 1 \end{pmatrix}$$

$$\begin{pmatrix} 1 & 1 \\ 1 & -1 \end{pmatrix} \begin{pmatrix} -1 & 0 \\ 0 & 1 \end{pmatrix} = H^* D2 = Q2 = \begin{pmatrix} -1 & 1 \\ -1 & -1 \end{pmatrix}$$

$$\begin{pmatrix} 1 & 1 \\ 1 & -1 \end{pmatrix} \begin{pmatrix} -1 & 0 \\ 0 & -1 \end{pmatrix} = H^* D3 = Q3 = \begin{pmatrix} -1 & -1 \\ -1 & -1 \end{pmatrix}$$

$$\underline{30}$$

FOR USER 0:  [1  1],  [1  −1],  [−1  1],  [−1  −1]

FOR USER 1:  [1  −1],  [1  1],  [−1  −1],  [−1  1]

Bit 1     Bit 2     Bit 3     Bit 4

FIG. 1
10

$\begin{pmatrix} 1 & 0 \\ 0 & 1 \end{pmatrix} = D0$ $\begin{pmatrix} 1 & 0 \\ 0 & -1 \end{pmatrix} = D1$ $\begin{pmatrix} -1 & 0 \\ 0 & 1 \end{pmatrix} = D2$ $\begin{pmatrix} -1 & 0 \\ 0 & -1 \end{pmatrix} = D3$

FIG. 2
20

$\begin{pmatrix} 1 & 1 \\ 1 & -1 \end{pmatrix} \begin{pmatrix} 1 & 0 \\ 0 & 1 \end{pmatrix} = H*D0 = Q0 = \begin{pmatrix} 1 & 1 \\ 1 & -1 \end{pmatrix}$ $\begin{pmatrix} 1 & 1 \\ 1 & -1 \end{pmatrix} \begin{pmatrix} 1 & 0 \\ 0 & -1 \end{pmatrix} = H*D1 = Q1 = \begin{pmatrix} 1 & -1 \\ 1 & 1 \end{pmatrix}$ $\begin{pmatrix} 1 & 1 \\ 1 & -1 \end{pmatrix} \begin{pmatrix} -1 & 0 \\ 0 & 1 \end{pmatrix} = H*D2 = Q2 = \begin{pmatrix} -1 & 1 \\ -1 & -1 \end{pmatrix}$ $\begin{pmatrix} 1 & 1 \\ 1 & -1 \end{pmatrix} \begin{pmatrix} -1 & 0 \\ 0 & -1 \end{pmatrix} = H*D3 = Q3 = \begin{pmatrix} -1 & -1 \\ -1 & 1 \end{pmatrix}$

FIG. 3
30

FOR USER 0:    [1  1],    [1 -1],    [-1  1],    [-1 -1]

FOR USER 1:    [1 -1],    [1  1],    [-1 -1],    [-1  1]

Bit 1       Bit 2       Bit 3       Bit 4

METHOD OF ENHANCING SECURITY FOR THE TRANSMISSION OF INFORMATION

FIELD OF THE INVENTION

The present invention relates generally to wireless communications systems and, in particular, to wireless communications systems based on code division multiple access (CDMA).

BACKGROUND OF THE RELATED ART

The well known system of Walsh Hadamard functions H (of length $2^n$, where n is a positive integer) form an orthogonal basis for the Euclidean space $R2^n$ and have range one and minus one. These functions have found application in the CDMA area for wireless communication. More recently, systems of Quasi-Walsh functions Q were introduced for application in CDMA wireless communication systems. These functions, having similar properties as the Walsh functions, also form an orthogonal basis for $R2^n$ and attain only values one and minus one. The systems of Quasi-Walsh functions are formed by negating arbitrarily specified tuples of Walsh Hadamard functions. In terms of matrix operations, the systems of Quasi-Walsh functions Q are row vectors obtained by post multiplying the Walsh Hadamard matrix H by a diagonal matrix D, which is comprised of ones and minus ones—i.e., Q=H D. Note that the values in each row vector represents a chip. This matrix representing Quasi-Walsh functions Q is a length preserving transformation called an isometry, or an orthonormal transformation, in this case where the underlying field is real valued. Since the Walsh Hadamard matrix is orthogonal along with the diagonal matrix D, the resulting product matrix Q is also orthogonal. Accordingly, distinct row vectors in Q, i.e., distinct Quasi-Walsh functions, have an inner product of zero. Note that when the diagonal matrix D is an identity matrix L the Walsh Hadamard matrix appears. Therefore, Walsh Hadamard matrix H is a special case of the Quasi-Walsh matrix when D=I.

SUMMARY OF THE INVENTION

The present invention utilizes systems of Quasi-Walsh functions for high resilience against interception and jamming in addition to allowing multiple access and acquisition. The present invention switches among generalized systems of Quasi-Walsh functions at some rate r, where r may either be a fixed or variable value not equal to zero. The present invention transmits a first set of information for a user over a communication channel using a first code, and transmits a second set of information for the user over the communication channel using a second code in place of the first code, wherein the first and second codes may be orthogonal codes or encryption codes and the communication channel has a fixed or variable datarate. The first and second codes may be indicated using an index, such as a pseudo-random sequence, an algorithm, a mathematical equation, a known or cyclical sequence, etc., wherein the index may be single or multi-valued. In one embodiment, the first and second codes correspond to row vectors i and j in a first and second systems of orthogonal functions. The row vectors i and j may be identical or different in their respective systems of orthogonal functions. Likewise, the first and second systems of orthogonal functions may be identical or different, and may be systems of Quasi-Walsh functions.

BRIEF DESCRIPTION OF THE DRAWINGS

The features, aspects, and advantages of the present invention will become better understood with regard to the following description, appended claims, and accompanying drawings where FIG. 1 depicts an example of four possible diagonal matrices $D_k$;

FIG. 2 depicts an example of four possible systems of Quasi-Walsh functions $Q_k$ derived using the diagonal matrices $D_k$ of FIG. 1; and FIG. 3 depicts an example of two chips used for modulating each bit being transmitted.

DETAILED DESCRIPTION

To begin, it will be assumed that a chipping rate of $2^n$ chips per information bit is employed although other chipping rates are possible. Accordingly, a standard $2^n \times 2^n$ Q matrix will be utilized throughout. As usual in CDMA applications, each user is assigned a specific row in the Q matrix, thereby allowing multiple access in the data channel. If more than $2^n \times 2^n$ users are desired, rows in a another Q matrix are designated to the additional users. In the latter case, the other Q matrix is chosen such that mutual interference is minimal. However, as before, it cannot be zero due to the non-orthogonality between any two systems of Quasi-Walsh functions Q. Generalization to arbitrary frames of systems of Quasi-Walsh functions Q is immediate. In the ensuing paragraphs, emphasis is placed on cases with no more than $2^n$ users. But it should be understood that the present invention is also applicable to more than $2^n$ users.

For convenience, the $i^{th}$ user will be assigned the $i^{th}$ row vector (or $i^{th}$ Quasi-Walsh function in a system of Quasi-Walsh functions) in Q for the first bit transmitted. Throughout, it is assumed, with the help of the pilot and synch channels, that perfect synchronization exists. Subsequently, the $i^{th}$ user will be assigned the $i^{th}$ row in distinct Q matrices, which are generated bit by bit. With each bit k transmitted, a diagonal matrix $D_k$ is found using a pseudo-random number generator. See FIG. 1 depicting an example of four possible diagonal matrices $D_k$, where k=0, 1,2,3. The number of possible distinct matrices is $2^{2^n}$. Moreover, the same $D_k$ can occur numerous times in a single realization, thereby making a potentially large period for a resulting Pseudo Noise (PN) type sequence. The unique matrix $D_k$, post-multiplies H to give $Q_k$=H $D_k$. See FIG. 2 depicting an example of four possible systems of Quasi-Walsh functions $Q_k$ derived using the diagonal matrices $D_k$ of FIG. 1. Accordingly, the $i^{th}$ user is provisioned always the same $i^{th}$ row, however, it very likely comes from different Quasi-Walsh systems for each information bit transmitted. To an observer without knowledge of the formula for isometry generation, the resulting string of Quasi-Walsh functions seems random, thus hard to intercept.

Generalization to support larger than $2^n$ users is straightforward. We illustrate here the approach for supporting $2^{(n-1)}$ users; generalization to support users in excess of this follows the same logic. For each bit k, two D matrices are chosen, $D_k^1$ and $D_k^2$ such that all the Quasi-Walsh functions they produce are "almost orthogonal" with each other. The first $2^n$ users will be assigned Quasi-Walsh functions from $Q_k^1$ as described before and the next $2^n$ users from $Q_k^2$.

For any specific bit, the $i^{th}$ user is assigned the $i^{th}$ row involving Quasi-Walsh functions $Q_k$, whereas the $b^{th}$ user is assigned the $b^{th}$ row involving the same Quasi-Walsh functions $Q_k$. As a consequence, no mutual interference occurs since these codes are orthogonal. Thus, just like in a maximal length large shift register PN sequence, a long Quasi-Walsh type PN sequence can result across successive bits. This sequence of successive bits has all the signal hiding benefits as does a shift register sequence. In other words, the Quasi-Walsh functions $Q_k$ are changed across successive bits using an index, wherein the index may be determined using a PN sequence, an algorithm, a mathematical function, a known sequence, etc. Additionally, it has the added benefit of orthogonality resulting in ease of multiple access and acquisition. The length of the Quasi-Walsh PN sequence, before it repeats is a function of the length of the random number generator each of which determines the isometry of $D_k$. As an added degree of randomness the $i^{th}$ user at each bit may use a row other then the $i^{th}$. The actual row involving the Quasi-Walsh functions $Q_k$ can change (using another pseudo-random number generator).

For a given $2^n \times 2^n$ Walsh Hadamard matrix H, $2^{2n}$ distinct systems of Quasi-Walsh functions occur due to post multiplication by distinct diagonal isometries $D_k$. The diagonal entries in these matrices will be interpreted in binary by replacing the minus ones on the diagonal by zeros. As a result, each distinct $D_k$ can be represented by an integer between 0 and ($2^{2n}-1$). Thus encoding, and correspondingly the decoding, can be efficiently represented by the specific index k associated with each bit.

As a simplified illustration, consider the following example. In R2, two chips are used per single bit of information, and two users will be considered. In this case, n=1. Four distinct diagonal orthogonal matrices arise, as shown earlier in FIG. 1. When each of these matrices $D_k$ are applied to the Walsh-Hadamard matrix H by post multiplication, the systems of Quasi-Walsh functions $Q_k$ shown in FIG. 2 are found.

To illustrate that for any realization consisting of all possible diagonal matrix isometries an equal number of ones and minus ones occur, consider the following. Referring to the previous illustration, for each of the four bits of information transmitted, a diagonal matrix isometry is utilized. Suppose that an index specifies the isometries $D_k$ in the following order: $D_0$, $D_1$, $D_2$, and $D_3$. Accordingly, the two chips used for modulating each bit transmitted are shown in FIG. 3. Note the equal number of 1 and −1 combinations both for User 0 and User 1.

The present invention is applicable to both Sylvester and non-Sylvester types. This permits operating in a non $2^n$ (n, integer) Real space The present invention is also applicable among non-orthogonal systems of Quasi-Walsh functions Q. Post multiplying Q by a permutation matrix P yields a generalized system of Quasi-Walsh function $Q^G$, i.e., $Q^G$=H D P. Note that here P has the same dimension (i.e., m×m) as H and D. Since, there are m! distinct Ps, the overall system of $Q^G$ increases by m! when compared to the system of Quasi-Walsh functions Q, improving the probability of finding cross system, low correlation generalized system of Quasi-Walsh functions, thereby yielding minimum mutual interference.

The process described above for assigning Quasi-Walsh functions works in the same manner for generalized systems of Quasi-Walsh functions $Q^G$, where $Q^G_j$=H $D_k$ $P_x$. Where k=1 to m (not necessarily equal to $2^n$) and x=1 to m! Thus the specific generalized systems of Quasi-Walsh functions is defined by j, which is a function of the two-valued tuple {k, x}. Thus information hiding can be accomplished by the two-dimensional index or tuple {k, x}, enhancing information-hiding properties. In one realization, as described above each user would use the same specific row vector across all bits with each user using a different row with respect to each other. In this specific realization, spreading sequence for bit j would be selected from $Q^G_j$.

Thus encoding, and correspondingly the decoding can be represented by the specific index j [or the tuple {k, x}] associated with each bit.

We claim:

1. A method of transmitting bits for an ith user compromising the steps of:

assigning an ith row vector to the ith user;

transmitting a bit n associated with the ith user using the ith row vector in a first system of orthogonal functions; and transmitting a bit n+r, where r is a variable not equal to zero associated with the ith user using the ith row vector in a second system of orthogonal functions, wherein the first system of orthogonal functions is not identical to the second system of orthogonal functions.

2. The method of claim 1, wherein the first and second systems of orthogonal functions are generalized systems of Quasi-Walsh functions.

3. The method of claim 1, wherein the first and second systems of orthogonal functions are indicated using an index.

4. The method of claim 3, wherein the index is defined by a pseudo-random number sequence.

5. The method of claim 3, wherein the index is defined by an algorithm.

6. A method of transmitting information comprising the steps of:

transmitting a first set of information for a user over a communication channel modulated using a first code, the first code corresponding to a row vector i in a first system of orthogonal functions; and transmitting a second set of information for the user over the communication channel modulated using a second code in place of the first code, the second code corresponding to a row vector j in a second system of orthogonal functions.

7. The method of claim 6 comprising the additional step of: transmitting a third set of information for the user over the communication channel modulated using a third code in place of the second code.

8. The method of claim 7, wherein the communication channel has a fixed or variable data rate.

9. The method of claim 6, wherein the first set of information corresponds to a bit n and the second set of information corresponds to a bit n+r, where r is a variable value not equal to zero.

10. The method of claim 6, wherein the first set of information corresponds to a bit n and the second set of information corresponds to a bit n+r, where r is a fixed value not equal to zero.

11. The method of claim 6, wherein the row vector i and the row vector j are different rows in their respective system of orthogonal functions.

12. The method of claim 6, wherein the first and second systems of orthogonal functions are generalized systems of Quasi-Walsh functions.

13. The method of claim 6, wherein the first system of orthogonal functions is not identical to the second system of orthogonal functions.

14. The method of claim 6, wherein the first system of orthogonal functions is identical to the second system of orthogonal functions.

15. The method of claim 6, wherein the row vector i and the row vector j are a same row in their respective system of orthogonal functions.

16. The method of claim 6, wherein the first and second systems of orthogonal functions are defined using an index.

17. The method of claim 16, wherein the index is defined by a pseudo-random number sequence.

18. The method of claim 16, wherein the index is defined by an algorithm.

19. The method of claim 6, wherein the row vector i and the row vector j are defined using an index.

20. The method of claim 19, wherein the index is defined by a pseudo-random number sequence.

21. The method of claim 19, wherein the index is defined by an algorithm.

22. The method of claim 6, wherein the first and second codes are indicated using an index.

23. The method of claim 22, wherein the index is defined by a pseudo-random number sequence.

24. The method of claim 22, wherein the index is defined by an algorithm.

* * * * *